United States Patent [19]

Desia et al.

[11] 4,434,186

[45] Feb. 28, 1984

[54] STABLE AERATED FROZEN FOOD PRODUCT

[75] Inventors: Nitin Desia, St. Paul; Rory A. M. Delaney, Minnetonka; Peter Brouwer, Plymouth; Victor T. Huang, Brooklyn Center, all of Minn.

[73] Assignee: The Pillsbury Company, Minneapolis, Minn.

[21] Appl. No.: 455,617

[22] Filed: Jan. 4, 1983

Related U.S. Application Data

[63] Continuation-in-part of Ser. No. 369,394, Apr. 19, 1982, abandoned.

[51] Int. Cl.$^3$ .............................................. A23G 9/02
[52] U.S. Cl. ................................... 426/565; 426/580; 426/613
[58] Field of Search ............... 426/565, 566, 567, 580, 426/613

[56] References Cited

U.S. PATENT DOCUMENTS

| | | | |
|---|---|---|---|
| 3,949,102 | 4/1976 | Hellyer | 426/565 |
| 3,993,793 | 11/1976 | Finney | 426/565 |
| 4,031,261 | 6/1977 | Durst | 426/580 |
| 4,219,583 | 8/1980 | Igoe | 426/580 |
| 4,346,120 | 8/1982 | Morley | 426/565 |

OTHER PUBLICATIONS

Arbuckle, W. S., Ice Cream, Third Ed., Avi Pub. Co. Inc., Westport, Conn., 1977, p. 222.

*Primary Examiner*—Jeanette M. Hunter
*Attorney, Agent, or Firm*—Mart C. Matthews; Michael D. Ellwein; Robert J. Lewis

[57] ABSTRACT

In a process for preparing an aerated frozen food product such as mellorine or a shake beverage wherein water, fat, protein, emulsifier and stabilizer are blended together to form a mix which is homogenized to form an oil-in-water emulsion and is subsequently whipped under freezing conditions, improved stability is achieved in the product by selecting a specific oil having high solid fat content at room temperature, homogenizing the mix of ingredients under conditions sufficient to form an emulsion having a relatively narrow distribution of small diameter fat globules, and aging the emulsion to crystallize the fat globules prior to whipping. Stable aerated frozen products provided in accordance with this invention can be stored and distributed at 0° F. without loss of quality and have a variety of commercial uses.

19 Claims, No Drawings

STABLE AERATED FROZEN FOOD PRODUCT

REFERENCE TO PRIOR APPLICATION

This application is a continuation-in-part of pending application Ser. No. 369,394 filed Apr. 19, 1982 now abandoned.

BACKGROUND OF THE INVENTION

Frozen aerated food products to which this invention is directed include frozen desserts such as ice cream, ice milk, mellorine, sherbet, frozen custard, frozen pudding and the like, frozen shake beverages such as milk shakes, and frozen shake concentrate. The popularity of these products is attributable to their convenience, widespread availability, nutritive value and appealing forms, colors and flavors. In part due to the familiarity of such frozen products to the consumer, to be acceptable they must not only have suitable flavor and appearance, but also possess a complex set of physical properties which provide the characteristics which consumers have come to expect. In addition, the nature and composition of the most popular aerated frozen products are set by various standards promulgated by the U.S. Food and Drug Administration as well as the individual states. Such rigid consumer acceptance criteria, regulatory standards and the complex nature of the interactions which produce a satisfactory product make it extremely difficult to reformulate such aerated frozen products in an attempt to provide improvements. Solutions to one set of problems quite often generate other problems which make the product unacceptable.

Stability is one major problem of conventional aerated frozen products. For example, ice cream and related aerated frozen desserts are stored, distributed, delivered and sold at deep freeze temperatures, i.e. −20° F., to give some measure of stability to these products and protect against deterioration of their special textural properties. This storage and distribution system, however, has many drawbacks both from the consumer's and manufacturer's point of view. One problem is that, at deep freeze temperatures, the product is so hard that it is difficult to scoop and serve immediately from the deep freeze.

Another major problem is that temperature fluctuations invariably occur during storage and handling of aerated frozen products which result in the thawing and refreezing of the product, seriously deteriorating its quality over time. This "heat shock" is characterized by the formation of large ice crystals, and results in excessive hardening and gritty mouthfeel. Heat shock frequently also produces a separation of the syrupy aqueous phase from the air and fat matrix which ultimately make the appearance and texture of the product unacceptable.

Several solutions to these problems have been attempted in the past. For example, increased stability has been imparted to aerated frozen desserts through the use of various stabilizers and stabilizer combinations. The drawback of this approach is that stabilizers frequently are required in such great quantities that the feel of the product in the mouth is altered, producing a cloying, gummy or greasy sensation. Another approach has been to increase the amount of added sugars relative to the fat and/or water in the product, but the large amount of sugar required to provide acceptable stability often results in too sweet a taste or unacceptable crystal formation. Still another approach has been to increase the amount of incorporated air, i.e., "overrun", and thereby decrease the amount of freezable water per unit volume. This attempt at reformulation, however, not only results in a texture which is more characteristic of a whipped topping than of a frozen dessert like ice cream, but is limited by the applicable standards of identity relating to required weight per volume and solids content.

As a result of the instability of most aerated frozen desserts, producers have been required to manufacture the products locally to avoid the long periods of storage and temperature variations which are associated with national distribution from a few centrally located plants. Since most producers, distributors and retailers rely on deep freeze temperatures for preserving the quality of ice cream-type frozen desserts during storage, distribution and sale, totally separate systems are required for such products than are used for other frozen foods, which can be distributed at temperatures ranging from 0° F. to 10° F. A very extensive network of frozen food storage, distribution and retailing facilities has been established nationwide, and therefore it can be seen that it would be extremely advantageous from an economic and efficiency standpoint if an ice cream-type aerated frozen dessert of acceptable quality and stability could also utilize this system.

Milkshakes and similar frozen shake beverages are representative of another type of aerated frozen food product in which poor stability has limited the storage and distribution systems which the manufacturer can utilize. As is well-known, milkshakes are usually manually prepared or dispensed from a commercial establishment for consumption on the premises. Various attempts have been made in the past to provide products which are more widely available or are more susceptible to automated procedures. For example, milkshakes have simply been packaged in individual cups and frozen solid for distribution. The product is then warmed under controlled conditions to room temperature, agitated or otherwise mixed, and served. Another approach has been to prepare and distribute a frozen milkshake concentrate which serves as a base to which milk or water is added with agitation. Still another approach has been to aseptically can or bottle a prepared milkshake which is consumed after being chilled, shaken and opened. All of these prior approaches have either required unacceptably large amounts of time or space, required a reconstitution step which is either difficult or time-consuming and/or have provided milkshakes which do not have the desired creaminess, coldness and consistency of commercially prepared milkshakes.

Since shakes are extremely popular items at fast food restaurants, it is of course important to reduce the time and labor involved in preparing large quantities of shakes manually. The present invention provides stable shakes which can be prepared in individual containers in central locations and shipped in a frozen state to various restaurant locations where they are stored and served at refrigeration temperatures without any on-site preparation.

Accordingly, it is an object of this invention to provide aerated frozen food products which are stable for sufficient periods of time to allow national distribution under conditions and temperatures encountered in 0° F. frozen food systems. Another object is to provide an aerated frozen product which attains the aforesaid stability without a basic reformulation which would bring the product outside the limits of consumer acceptance and regulatory standards. A still further object of the invention is to provide aerated frozen dessert products having the above attributes which are also soft and scoopable at freezer temperatures. Another object is to provide shakes and similar beverages having the above attributes which retain the desirable characteristics of commercially prepared milkshakes when served at refrigeration temperatures (e.g. 15° F.–25° F.). A related object is to provide a frozen shake concentrate which can readily be reconstituted by the consumer into a high-quality shake.

SUMMARY OF THE INVENTION

In accordance with the present invention, the fat component of the aerated frozen food product comprises an edible oil which has a solid fat index (SFI) of at least 25 at 70° F. The mix containing this fat is homogenized to form an emulsion of fat globules having an average volume/surface diameter ($d_{vs}$) of 0.2 to 1.5 microns, and a ratio of maximum fat globule diameter ($d_{max}$) to $d_{vs}$ having a quotient of from 9 to 14. The emulsion is subsequently aged to crystallize the fat globules prior to whipping. The vast majority of the fat in the product, i.e. at least 94%, is in the form of fat dispersed in the aqueous phase with only a small amount, i.e. less then 6%, in the form of free or de-emulsified fat. The overrun of the aerated frozen food product is preferably from 50% to 110%.

The stable aerated frozen food products of the invention are extremely versatile and can be given a variety of textures and consistencies by varying the formulation. A preferred embodiment of the invention comprises a stable mellorine product having 52% to 57% water in the form of ice crystals and an aqueous phase, 10% to 15% of the aforementioned edible oil, 4% to 15% non-fat milk solids, and minor but effective amounts of stabilizer and emulsifier. Preferably, the whipping step is sufficient to provide an overrun in the range of 60% to 90% in order to produce mellorine having the textural characteristics and appearance of conventional ice cream. Products having the characteristics of soft-serve ice cream at 0° F. may further comprise a freezing point depressant, preferably in the form of added sugars or other soluble solutes.

Ready-to-serve shake beverages having improved stability are also provided in accordance with this invention by increasing the amount of water in the above-mentioned formulation and lowering the overrun to achieve the desired shake consistency. Preferred shakes of the invention comprise about 63% to 68% water, 3% to 9% of the aforementioned edible oil, and about 50% to 70% overrun. These shake products can be distributed through conventional frozen food systems in solid frozen form and then stored for several days at refrigeration temperatures (15° F. to 25° F.) before consumption without losing the desirable characteristics of commercially prepared milkshakes. The invention can also be employed to provide a frozen concentrate to which water or other liquids are added at room temperature with stirring to produce shake beverages.

DETAILED DESCRIPTION OF THE INVENTION

It has quite unexpectedly been found that the selection and processing of the fat component during the preparation of the aforementioned aerated frozen food products are critical elements in achieving the unique stability of this invention. Because of the solid fat index (SFI) and other properties of the fat used, the small dispersed fat globules are substantially all crystallized during the aging step and a significant amount of these solid crystals are retained when the product is exposed to room temperature. Without intending to be bound by theory, it is thought that the mobility of the aqueous phase during thawing and refreezing of the product is significantly restricted by these finely distributed fat crystals, thereby resulting in products which develop less iciness and retain overrun better when exposed to heat shock than otherwise could be provided. This property in turn is thought to account in large part for the improved shelf life stability of the present products at typical frozen food temperatures.

Preparation in accordance with this invention results in aerated frozen food products which have sufficient stability to retain their desirable organoleptic properties for at least 50 days, and preferably as long as 180 days, at conditions which are normally encountered in typical 0° F. frozen food storage, distribution and retailing systems. As a result, the products may be manufactured in a relatively few plants and distributed nationally and/or internationally using the same facilities as other frozen food items such as frozen vegetables, frozen entrees and frozen pizza. Frozen dessert products of the invention do not require a separate deep freezer in the retail store, and can be sold and/or consumed directly from the frozen food case or home freezer. The shake beverages of the invention can be delivered to the restaurant site frozen solid in individual containers and then stored and dispensed directly from a dispenser having a chamber in which the product has equilibrated to a temperature from 15° F. to 25° F. Alternately, shakes can easily be prepared at home from a frozen concentrate of the invention stored in the home freezer. Preferably, 2 or 3 parts of frozen concentrate are diluted at room temperature (65° F. to 75° F.) with one part of water, or some other suitable liquid such as milk or juice, and then the diluted concentrate is stirred with a spoon to form the shake.

As briefly described above, the oils suitable for use in the practice of this invention have a Solid Fat Index (SFI) at 70° F. of at least 25. SFI values are readily determined in accordance with standard analytical procedures using a dilatometer. Although the oil has a significant solid fat content at 70° F., it should be liquid at that temperature or easily liquefiable on warming and be substantially completely melted at about 100° F. or slightly above. As used herein and in the claims the term "oil" is intended to designate liquid fats meeting these requirements. Generally, the preferred oils are hydrogenated vegetable oils which have a (capillary) melting point between 70° F. and 106° F., or blends of such vegetable oils. Suitable oils are derived from coconut, soybean, cottonseed, corn, palm kernel, peanut or the like. The solid fat in the most preferred oils melts quickly between 70° F. and 100° F. and these oils exhibit a sharp peak on a Differential Scanning Calorimetry curve. Since ice cream, ice milk, and milkshake standards require the use of butter fat, it is contemplated that high melting point fractions of butter oil meeting the SFI requirements of the invention could also be used to produce stable ice cream, ice milk, and milkshake products in accordance with this invention.

The amount of the fat component will vary depending on the aerated frozen food product being prepared and the particular organoleptic properties desired. Generally, the amount of the fat component comprises about 3% to 30% by weight of the frozen product, with the preferred mellorine products comprising 5% to 30% fat, most preferably 10% to 15% fat. The most preferred shake products of the invention comprise from 3% to 9% fat.

The fat component of this invention can be mixed with other ingredients at ambient temperatures but is preferably injected at an elevated temperature, e.g. about 160° F., into the aqueous mix containing the other ingredients. The resultant mixture is then homogenized, primarily to reduce the size of the fat globules and form a stable oil-in-water emulsion. In accordance with the preferred embodiment of the invention, the mix is homogenized at a low pressure, i.e., a total pressure below 6000 psig, to provide a uniform distribution of small fat globules in the emulsion.

The designations "$d_{vs}$" and "$d_{max}$" used herein and in the appended claims to characterize the particle size of the emulsion are derived from the spectroturbidimetry method described in detail by Walstra [P. Walstra, *Estimating Globule-Size Distribution of Oil-In-Water Emulsions by Spectroturbidimetry.* J. Coll. Interf. Sci. Vol. 27, No. 3, P. 493–500 (1968); and P. Walstra, *Light Scattering by Milk Fat Globules,* Neth. Milk and Dairy J., Vol. 19, No. 2, P. 93–109 (1965)]. In general, this technique is based on the principle that the turbidity of an emulsion such as milk can be used to determine the average particle size and particle size distribution of the dispersed oil phase. In this method, a light beam is directed through the emulsion and the light scattering coefficient is taken as a function of a dimensionless number derived from the particle size of the suspended fat globules and the wavelength of the light. The transmittance and absorbance of the light beam incident on the emulsion contained in a standard cell is measured for various wavelengths using a spectrophotometer, and then these values are used to construct a light scattering spectrum. Homogenized emulsions typically show a log normal frequency-volume distribution, so a computer is used to generate a theoretical light scattering spectrum based on a log normal particle size distribution. The volume/surface average diameter of the fat globules (herein and in the claims referred to by the designation $d_{vs}$) and the maximum emulsion diameter (herein and in the claims referred to by the designation $d_{max}$) are mathematically calculated from the "fit" of the experimentally derived curve to the theoretical curve.

In accordance with the present invention, the mix is homogenized to provide a $d_{vs}$ of 0.2 to 1.5 microns, preferably 0.2 to 0.5 microns, with the ratio of $d_{max}/d_{vs}$ having a quotient of from 9 to 14. As previously stated, this relatively narrow distribution of small fat globules in combination with the solid fat characteristics of the oil used has been found to be very important in achieving the improved shelf-life characteristics of the present invention.

Homogenizers commonly used in ice cream manufacture may be employed to homogenize the mix. Although homogenizing techniques not utilizing pressure may be used, a homogenization pressure not in excess of a total of 6000 psig is preferred. In fact, one advantage of the present invention is that the desired homogenization can be achieved at pressures lower than that usually employed in conventional ice cream manufacture, e.g. pressures below 3000 psig. Homogenization is preferably accomplished at temperatures of 110° F. to 180° F.

The vigorous agitation of the mix during freezing and whipping inevitably results in some destabilization of the fat emulsion in the form of fat "churnout" or "de-emulsification", i.e., a coalescense wherein the fat globule loses its identity as a dispersed entity and forms pools, and/or "clumps" together to form larger particles. In addition, the emulsion prior to whipping may inherently contain some of this "free" fat. The current understanding in the ice cream art is that such physical properties as dryness and stiffness are related to the degree of de-emulsification of the fat. It is believed that too little de-emulsification results in a wetter-appearing and less stiff ice cream, whereas too much de-emulsification may result in a coarser texture. In addition, a coating of de-emulsified fat around the air cells tends to improve the foam stability of the product and is considered desirable. However, too much de-emulsified fat in the continuous phase may give a fatty or too creamy sensation to the frozen product.

It has quite surprisingly been found that the products of this invention exhibit considerably less fat de-emulsification, or free fat, than conventional frozen desserts and shake products. In the present products, at least 94% of the total fat is in the emulsified form and less than 6% of the total fat is in the de-emulsified form, whereas conventional ice cream, for example, typically has about 13% of the total fat in the de-emulsified form. The relatively narrow distribution of small fat crystals produced as a result of the homogenization and aging steps of the invention is substantially retained after the freezing and aeration step and this in turn is believed to contribute to this low incidence of de-emulsified fat.

De-emulsified fat can be extracted by hydrophobic organic solvents such as chloroform because of its "free" character, whereas emulsified fat cannot. Therefore, the level of de-emulsified fat in the frozen product can readily be determined by mixing a sample with chloroform, removing the chloroform soluble fraction, evaporating the chloroform and weighing the residue. De-emulsified fat so determined is then expressed as a percentage of the total fat.

The fat component of the invention may be used with mono and diglyceride emulsifiers and other emulsifiers normally used in aerated frozen food products and/or permitted by the applicable standards of identity. Such emulsifiers are typically used in amounts ranging from 0.1% to 0.5%, preferably less than 0.3%. The emulsifiers may be conveniently melted with the fat component and metered together into the mix prior to homogenization.

The mix may be pasteurized before or after homogenization in accordance with known commercial procedures. For example, continuous high temperature/short time (HTST) pasteurization is the most common method used by the larger ice cream plants and is suitable for the practice of the present invention. Minimum pasteurization standards for ice cream mix recommended by the U.S. Public Health Service are 175° F. for 25 seconds for the HTST method, and 155° F. for 30 minutes for the alternative holding method.

Following homogenization and pasteurization, the mix is rapidly cooled and held ("aged") at 30° F. to 45° F. for a time sufficient to cause extensive crystallization of the fat globules, usually from 2 to 12 hours. It is believed that the resultant distribution of small fat crystals which retain a significant amount of solid fat at room temperature not only aids in the freeze-thaw stability of the product by providing physical barriers limiting the mobility of the aqueous phase, but also contributes to improved physical properties of the frozen product, such as a smoother texture.

After sufficient aging, the mix is simultaneously aerated ("whipped") and frozen in the conventional manner. In a continuous freezer, the mix is rapidly cooled to freezing temperature and air is simultaneously incorporated to form the basic foam structure of small uniformly dispersed air cells. These processes take place under conditions of vigorous agitation provided by a "mutator", a rotating cylindrical device equipped with scraper blades and a whipping mechanism. The residence time during freezing is usually on the order of 25 to 30 seconds. As freezing proceeds, the mass becomes increasingly viscous and is finally extruded into containers from the freezer in a stiff plastic condition. The product may then be further frozen (hardened) at a temperature of about −40° F. to −80° F. prior to storage at typical frozen conditions.

The amount of incorporated air, i.e., the "overrun", is important to the overall stability of aerated frozen products, yet must be controlled within certain limits to provide an acceptable texture and appearance. Generally, the higher the overrun, the lower the amount of water per unit of volume, and therefore the more resistant the product is to the formation of the large ice crystals after heat shock. Although high overrun aerated frozen products exhibit increased stability, increasing the overrun to improve the stability will not always produce an acceptable product since there are limits placed on the amount of air incorporated in the product, both by the various standards of identity and consumer preference. For example, federal regulations on solids content and weight/volume relationships for ice cream and related products, such as mellorine and ice milk, effectively limit the overrun to about 110%. Frozen desserts having overruns in excess of this amount tend to exhibit textural properties which are not characteristic of ice cream, and therefore are not preferred by consumers. The practice of the present invention is particularly advantageous for stabilizing ice cream-type frozen desserts without requiring overruns over 110%. Although products of this invention generally comprise less water than conventional ice cream-type products, they have similar overrun so as to retain the familiar textural properties of ice cream. Preferably, the frozen mellorine desserts and shake concentrates described herein comprise from 45% to 68% water, with 52% to 57% water being the most preferred range. Overrun for these products is usually from 50% to 110%, preferably about 60% to 90%.

There are no existing standards which dictate the amount of overrun in milkshakes and similar frozen shake products. However, such products usually become too foamy to be acceptable at overruns of 80% or over, and too liquid or thin at overruns of 30% or below. For the ready-to-serve frozen shakes of this invention, the preferred water content is 63% to 68% and the preferred overrun is about 50% to 70%.

A stable foam (aerated) phase imparts a structural rigidity to the subject frozen food products and aids in limiting the mobility of the aqueous phase which causes the separation of the phases during prolonged storage. To this end, foam stabilizers are useful in the practice of the present invention. Among the most useful stabilizers are the hydrophilic colloids, or hydrocolloids, commonly referred to as "gums". These long-chain high-molecular-weight polymers disperse in the aqueous phase and/or interact with other product ingredients to provide a thickening or gelling effect which stabilizes the foam structure. They also contribute to the stability of the product by serving as water-binding ingredients which limit the mobility of the aqueous phase. Common gums suitable for use in the present invention include natural gums such as carrageenan, guar gum, locust bean gum, xanthan gum, gelatin, alginates, pectin, dextran, glucan and the like, as well as modified natural gums such as carboxymethyl cellulose, methylcellulose ether and other modified cellulose derivatives, modified starch, polyacrylic acid, and the like, and various mixtures thereof. The permitted quantities of gums may be governed by federal and/or state regulations, as well as by consumer preference regarding such physical properties as mouth feel and melt-down rate. The unique stability characteristics of the products of this invention allow very small amounts of stabilizers to be used, preferably quantities much less than 1% and most preferably less than 0.3%.

Aerated frozen dessert products of the invention may be given hardness and texture at 0° F. which simulate that of commercially available soft-serve ice cream. Conventional soft-serve ice cream products are usually prepared using machinery located on the premises where they are consumed and are served at temperatures slightly below freezing, e.g., 15°–25° F. Accordingly, these products characteristically have poor keeping qualities which prevent their effective distribution and storage off the premises. If exposed to the deep freeze temperatures necessary to prolong their shelf life, conventional soft-serve products become very hard and cannot be scooped from a container for serving. To solve this problem, aerated frozen dessert products sometimes include greater than normal quantities of sugars, alcohols and other low molecular weight compounds to lower the freezing point of the aqueous phase to an extent where the product is soft and scoopable and has a soft-serve texture at freezer temperatures. Frozen shake concentrates are also made more easily dispersible by the addition of such compounds. It has been found that the use of such freezing point depressants is compatible with the practice of the present invention and that the unique stability of the products can readily be achieved with formulations including such compounds.

The most useful freezing point depressants in the practice of this invention are sugars which not only have a sweetening effect, but also enhance the creamy texture of the product. The choice of sugars employed is controlled by the degree of freezing point depression desired and also by flavor and texture effects resulting from the addition of such sugars. An insufficient amount of sugar will produce an off-taste in the product, whereas too much sugar will produce excessive sweetness and may mask other desirable flavors. Different sugars also lower the freezing point of the product to varying degrees, depending on their molecular weights.

Preferably, the amount of added sugars in the products of this invention is 18% to 33% by weight. It has been found that the most desirable balance of sweetness and textural properties may be achieved by employing sucrose in combination with one or more sugars which are less sweet; for example, sucrose may be combined with dextrose, lactose, low-conversion corn syrup, etc; in order to obtain the benefits of a relatively large proportion of sugar at a level of sweetness which is less than that resulting from the use of an equal amount of sucrose alone.

The products of this invention comprise 4% to 15% non-fat milk solids. Although non-fat milk solids are the preferred source of protein, it is contemplated that other suitable frozen dessert proteins, such as casein, caseinates, whey protein concentrate, egg protein, and soy, peanut and/or vegetable proteins may be used. Non-fat milk solids are the solids of skim milk and can be added in dry form or as condensed skim milk. These solids include proteins, minerals and milk sugar. Milk sugar adds to the sweet taste of the frozen product and proteins aid in the development of the desired overrun as well as contribute to the desirable texture and body of the product. The use of larger amounts of non-fat milk solids increases the effect that whipping has on the frozen product and increases the viscosity and resistance to melting of the composition. They also tend to lower the freezing point of the product. Non-fat milk solids which contain not less than 2.5 mg/g undenatured whey protein nitrogen per gram of milk solids, as determined by the procedure set forth in American Dry Milk Institute Bulletin 916, are preferred.

The following examples are intended to illustrate the present invention, and are not to be construed as limiting the invention in any way:

Example I

A series of six frozen aerated desserts were prepared containing the following ingredients in parts by weight:

|  | Parts/Weight |
| --- | --- |
| Non-fat Dry Milk Solids | 6.60 |
| Fat Component | 12.00 |
| Dextrose | 21.2 |
| Sucrose | 4.10 |
| Corn Syrup | 2.40 |
| Xanthan Gum | 0.264 |
| Carrageenan | 0.004 |
| Emulsifier | 0.10 |
| Flavoring | 0.40 |
| Coloring | 0.84 |
| Water | 52.10 |

The samples were made according to the following procedure:

48 pounds of the fat component was melted with 0.4 pounds of the emulsifier component by heating to a temperature of 110° F. in a 70 gal. jacketed container to form the fat phase. 26.4 pounds of non-fat dry milk solids was dispersed in 206 pounds of water and the remaining ingredients (122 pounds) were added to form the aqueous phase. The fat and aqueous phases were mixed together at 160° F., homogenized at a pressure of 1500 psi, and the emulsion thus formed was pasteurized at 175° F. for 25 seconds. The mix was then cooled to between 30° F. and 40° F. and aged for 12 hours at 40° F. The aged mix was aerated in an ice cream freezer at about 16° F. to provide an overrun of about 75%, extruded into suitable containers, hardened at a temperature of −40° F. to −80° F. and stored in a 0° F. freezer.

The SFI values of the fat components employed in the six samples were as follows:

| Sample SFI at 100° F. | Fat Component | SFI at 70° F. |
| --- | --- | --- |
| A | Coconut Oil | 46.10 |
| B | Coconut Oil | 37.40 |
| C | Coconut Oil | 26.60 |
| D | Soy/Coconut Oil Blend | 20.00 |
| E | Soybean Oil | 16.90 |
| F | Anhydrous Butter | 13.80 |

The average fat particle size ($d_{vs}$) of each sample was from 0.2 to 0.5 microns, and the $d_{max}/d_{vs}$ quotient was in the range from 9 to 14. The amount of free fat for each sample was 2% to 3% using the chloroform extraction method.

The samples were subjected to conditions which were representative of those encountered in a typical 0° F. distribution system. Samples in their containers on a "mock" pallet were removed from the 0° F. freezer, kept for 2–4 hours at room temperature (about 70° F.), and then placed back in the 0° F. freezer for 20–22 hours. This procedure was repeated 4 or 5 times.

After undergoing the above freeze-thaw cycles, the samples were submitted to test panels consisting of 10 to 15 people, who were asked to rate them for iciness and softness. Samples A, B, and C incorporating the present invention were judged by the panels to be acceptable, whereas the remaining samples not incorporating the invention were determined to be unacceptable.

Example II

A Sample G employing the coconut oil of Sample B was prepared and subjected to heat shock in accordance with the procedure described in Example I, except that Sample G was prepared in a low shear device (i.e. an Oakes mixer) to provide an average particle size ($d_{vs}$) of 6.4 microns and a ratio of $d_{max}$ to $d_{vs}$ having a quotient of 2.0. Sample G was considered to be unacceptably unstable to heat shock and was judged to be icy and coarse by the evaluation panel.

Example III

A frozen shake product was prepared using the procedure of Example I and the following formula:

|  | Parts/Weight |
| --- | --- |
| Non-fat Dry Milk Solids | 10.000 |
| Coconut Oil | 5.715 |
| Dextrose | 14.000 |
| Sucrose | 6.000 |
| Xanthan Gum | 0.175 |
| Carrageenan | 0.060 |
| Emulsifier | 0.100 |
| Flavoring | 0.400 |
| Coloring | 0.400 |
| Water | 63.150 |
| Overrun | 60% |

This product (Sample H) was extruded into a 14 fl. oz. waxed paper cup and placed in a 20° F. refrigerator along with a prior art frozen shake (Sample I) made in accordance with Arbuckle U.S. Pat. No. 3,479,187. Samples H and I were taken from the refrigerator, and along with Sample J, a typical fast food restaurant shake, they were allowed to sit at room temperature (72.4° F.) for 40 minutes. Both Sample I and J exhibited symptoms of instability after this time. Sample J developed a phase separation band about 2 cm wide at the bottom, and large (about 0.3 cm diameter) air bubbles on the top to give a very foamy appearance. Sample I developed a rim of fluid around an unappealing icy lump in the center of the shake. However, there were no significant changes observed in Sample H, during this time period, thereby demonstrating the superior stability of the shake beverages of the present invention when compared to prior art products.

What is claimed is:

1. In a process for preparing an aerated frozen dessert product, wherein water, fat, protein, emulsifier and stabilizer are blended together to form a mix and said mix is homogenized to form an oil-in-water emulsion which is subsequently whipped under freezing conditions, the improvement which comprises:
    selecting an edible oil which has an SFI of at least 25 at 70° F.;
    homogenizing said mix to form an emulsion of fat globules having a particle size wherein the average $d_{vs}$ value is 0.2 to 1.5 microns, and a particle size distribution wherein the ratio of $d_{max}$ to $d_{vs}$ has a quotient in the range from 9 to 14;
    aging the homogenized mix to crystallize said fat globules prior to said whipping and freezing; and
    substantially retaining said particle size and particle size distribution after said whipping and freezing.

2. A process as defined in claim 1 wherein said mix is homogenized at a pressure less than 6000 psig.

3. A process as defined in claim 1 wherein said homogenized mix is aged at 30° F. to 45° F. for 2 to 12 hours prior to whipping and freezing.

4. A process as defined in claim 1 wherein said aged mix is whipped to an overrun of 50% to 110% to provide a frozen dessert product.

5. A process as defined in claim 1 wherein said aged mix is whipped to an overrun of about 50% to 70% to provide a frozen shake product.

6. A process for preparing a stable aerated frozen dessert product, which process comprises the steps of:
    mixing 45% to 60% water, 5% to 30% edible oil having an SFI of at least 25° to 70° F., 4% to 15% non-fat milk solids, and minor but effective amounts of stabilizer and emulsifier to form a mix;
    homogenizing said mix to form an emulsion of fat globules having a particle size wherein the average $d_{vs}$ value is 0.2 to 1.5 microns and a particle size distribution wherein the ratio of $d_{max}$ to $d_{vs}$ has a quotient of from 9 to 14;
    aging the homogenized mix at 30° F. to 45° F. for 2 to 12 hours to crystallize said fat globules;
    whipping the aged mix under freezing conditions to an overrun of 50% to 110%; and
    substantially retaining said particle size and particle size distribution after said whipping and freezing.

7. A process as defined in claim 6 wherein the oil and emulsifier are melted together and injected just prior to homogenization into a solution of the remaining ingredients in the water.

8. A process as defined in claim 6 wherein the aerated frozen dessert is hardened at −40° F. to −80° F. after whipping.

9. A process as defined in claim 8 wherein the hardened aerated frozen dessert is stored, distributed, sold and consumed at 0° F. to 10° F.

10. A process as defined in claim 8 wherein 2 to 3 parts of the aerated frozen dessert are diluted at room temperature with one part of liquid and stirred to form a shake beverage.

11. A process for preparing a stable shake beverage which process comprises:
    mixing 63% to 68% water, 3% to 9% edible oil having an SFI of at least 25 at 70° F., 4% to 15% non-fat milk solids, and minor but effective amounts of stabilizer and emulsifier to form a mix;
    homogenizing said mix to form an emulsion of fat globules having a particle size wherein the average $d_{vs}$ value is 0.2 to 1.5 microns and a particle size distribution wherein the ratio of $d_{max}$ to $d_{vs}$ has a quotient of from 9 to 14;
    aging the homogenized mix at 30° F. to 45° F. for 2 to 12 hours to crystallize said fat globules;
    whipping the aged mix under freezing conditions to an overrun of 50% to 70%;
    substantially retaining said particle size and particle size distribution after said whipping and freezing;
    placing the aerated frozen product into individual containers; and
    allowing said aerated frozen product to equilibriate to a temperature of from 15° F. to 25° F. until it develops a shake consistency.

12. A process as defined in claim 11 wherein the aerated frozen product is hardened at −40° F. to −80° F. after it is placed into individual containers.

13. A stable aerated frozen food product comprising:
    45% to 68% water in the form of ice crystals and an aqueous phase;
    4% to 15% non-fat milk solids;
    3% to 30% edible oil having an SFI of at least 25 at 70° F., a majority of said oil being dispersed in said aqueous phase in the form of crystallized fat particles having a $d_{vs}$ value of 0.2 to 1.5 microns and a ratio of $d_{max}$ to $d_{vs}$ having a quotient of from 9 to 14; and
    minor but effective amounts of emulsifier and stabilizer.

14. A product as defined in claim 13 having an overrun of 50% to 110%.

15. A product as defined in claim 13 wherein at least 94% of said oil is dispersed in said aqueous phase in the form of said crystallized fat particles and less than 6% of said oil is in the form of de-emulsified fat.

16. A product as defined in claim 13 which further comprises a hydrocolloid stabilizer system in a quantity less than 1%.

17. A product as defined in claim 13 which comprises 0.1% to 0.5% emulsifier.

18. A stable frozen mellorine product comprising:
    52% to 57% water in the form if ice crystals and an aqueous phase;
    4% to 15% non-fat milk solids;
    10% to 15% edible oil having an SFI of at least 25 at 70° F., at least 94% of said oil being dispensed in said aqueous phase in the form of crystallized fat particles having a $d_{vs}$ value of 0.2 to 0.5 microns and a ratio of $d_{max}$ to $d_{vs}$ having a quotient of from 9 to 14, and less than 6% of said oil in the form of de-emulsified fat;
    18% to 33% added sugars; and
    an overrun of 60% to 90%.

19. A stable ready-to-serve shake beverage comprising:
    63% to 68% water in the form of ice crystals and an aqueous phase:
    4% to 15% non-fat milk solids;
    3% to 9% edible oil having an SFI of at least 25 at 70° F., at least 94% of said oil being dispensed in said aqueous phase in the form of crystallized fat particles having a $d_{vs}$ value of 0.2 to 0.5 microns and a ratio of $d_{max}$ to $d_{vs}$ having a quotient of from 9 to 14, and less than 6% of said oil in the form of de-emulsified fat;

18% to 33% added sugars;
0.1% to 0.3% mono- and/or di-glyceride emulsifiers;
less than 0.3% of a hydrocolloid stabilizer; and
an overrun of 50% to 70%.

* * * * *

UNITED STATES PATENT AND TRADEMARK OFFICE
CERTIFICATE OF CORRECTION

PATENT NO. : 4,434,186

DATED : February 28, 1984

INVENTOR(S) : Nitin Desai et al.

It is certified that error appears in the above-identified patent and that said Letters Patent is hereby corrected as shown below:

On the title page the inventor's name should read

-- Nitin Desai --.

Column 11, line 39, "60%" should read -- 68% --.

Column 11, line 39, "5%" should read -- 3% --.

Signed and Sealed this

Twenty-ninth Day of January 1985

[SEAL]

Attest:

DONALD J. QUIGG

*Attesting Officer*     *Acting Commissioner of Patents and Trademarks*